United States Patent
Perks et al.

(10) Patent No.: US 7,624,603 B2
(45) Date of Patent: Dec. 1, 2009

(54) QUICK RELEASE LOCK

(76) Inventors: Trevor Perks, 31 Somerville Road, Sanford, North Somerset (GB) BS25 5RR; Dale N. Padjen, 10820 32nd Ave., Pleasant Prairie, WI (US) 53158

( * ) Notice: Subject to any disclaimer, the term of this patent is extended or adjusted under 35 U.S.C. 154(b) by 178 days.

(21) Appl. No.: 11/800,516

(22) Filed: May 7, 2007

(65) Prior Publication Data
US 2007/0209408 A1 Sep. 13, 2007

Related U.S. Application Data

(63) Continuation-in-part of application No. 11/407,834, filed on Apr. 21, 2006, now abandoned.

(51) Int. Cl.
*B65D 55/14* (2006.01)
(52) U.S. Cl. .................. 70/167; 70/14; 70/208; 70/230
(58) Field of Classification Search ............. 70/14, 70/158, 163, 164, 166, 167, 208, 229, 230; 411/350, 554, 555
See application file for complete search history.

(56) References Cited
U.S. PATENT DOCUMENTS

| | | | | |
|---|---|---|---|---|
| 3,222,744 A * | 12/1965 | Dellith | ................ | 411/555 |
| 3,302,434 A * | 2/1967 | Dauenbaugh et al. | ......... | 70/208 |
| 3,584,350 A * | 6/1971 | Schenk | ................ | 411/555 |
| 3,594,876 A * | 7/1971 | Gunther | ................ | 411/555 |
| 3,656,466 A * | 4/1972 | Dzus, Jr. | ................ | 411/555 |
| 3,927,444 A * | 12/1975 | Schenk | ................ | 411/555 |
| 4,343,161 A * | 8/1982 | Gale | ................ | 70/167 |
| 4,378,615 A * | 4/1983 | Gunther | ................ | 411/555 |
| 4,476,699 A * | 10/1984 | Dahlborg | ................ | 70/34 |
| 4,539,828 A * | 9/1985 | Teleky | ................ | 70/369 |
| 4,911,573 A * | 3/1990 | Pietro | ................ | 403/349 |
| 5,027,630 A * | 7/1991 | Stillwagon et al. | ............ | 70/391 |
| 6,694,783 B2 * | 2/2004 | Trempala | ................ | 70/167 |

* cited by examiner

*Primary Examiner*—Suzanne D Barrett
*Assistant Examiner*—Christopher Boswell
(74) *Attorney, Agent, or Firm*—Basil E. Demeur; Alan B. Samlan; David J. Hurley

(57) ABSTRACT

There is disclosed an improved lock assembly particularly suited for bulk vending machines, the lock assembly formed by an upper portion including a lock barrel having a lock collar extending downwardly therefrom, the lock collar having a tubular configuration with a hollow interior. A lock pin is secured within the hollow confines of the lock collar. The lock assembly further includes a lock post which is intended to be screwthreadedly mounted to a mounting bar, and the lock post including a first diametric channel cut into the upper portion thereof along a diametric centrally positioned plane, and continues into a curvilinear channel, ending at a pair of opposed stop points, the plane formed by the stop points being exactly 90° perpendicular to the plane formed by the diametric lock channel.

1 Claim, 2 Drawing Sheets

Fig. 4
Fig. 5
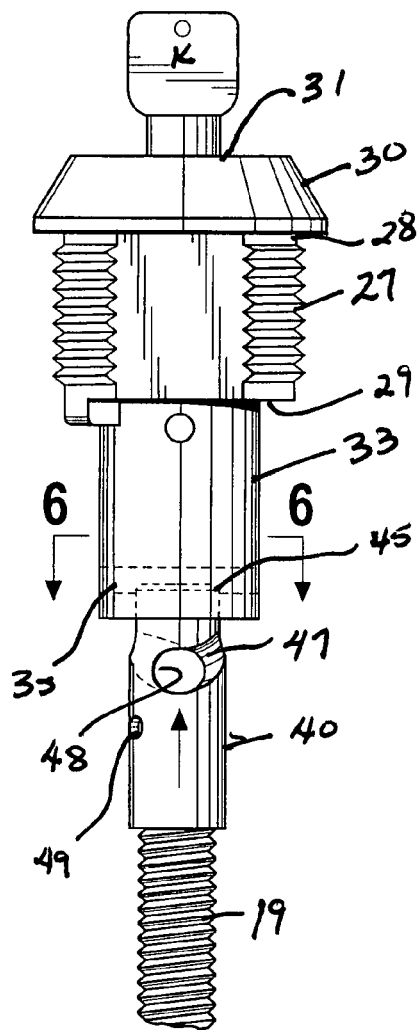
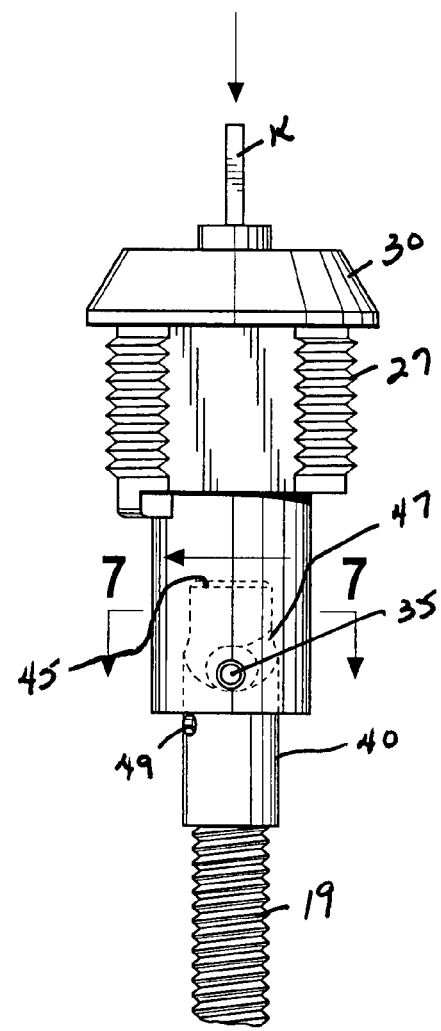
Fig. 6
Fig. 7
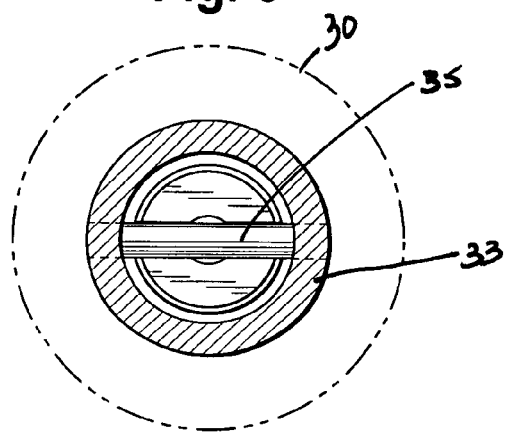
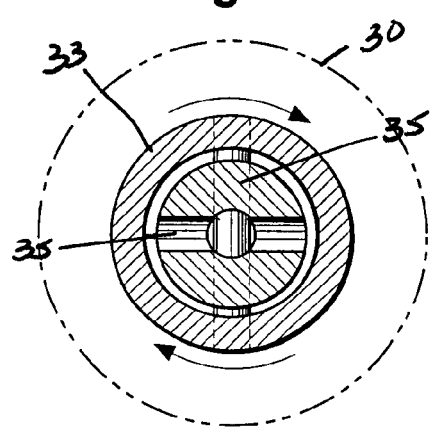

QUICK RELEASE LOCK

REFERENCE TO CROSS RELATED APPLICATION

This application is a continuation in part application based upon application Ser. No. 11/407,834 filed on Apr. 21, 2006 now abandoned under the title Quick Release/Secure Lock Converter and Lock for a Vending or Gaming Machine or the like and listing Trevor Perks of Sanford United Kingdom and Dale N. Padjen of Pleasant Prairie Wis. as co-inventors.

BACKGROUND OF THE INVENTION

The present invention has relevance in connection with a lock specifically intended for the bulk vending machine type apparatus. A bulk vending machine is generally the type which has a hopper or a product container, into which a vendible product is loaded. The product is vended usually by means of a coin mechanism to the ultimate user. In operation, the vending machine will have a hopper enclosed by a top cap, which, when removed, affords the operator access to the hopper or container. The operator then loads the vendible product into the hopper, and encloses it by placing the cap on the top of the hopper and locking the same into position. In this manner, the machine is ready for operation to vend product in response to a coin inserted in the coin mechanism by the ultimate consumer.

It will be appreciated that machines of this type are extremely prevalent, for vending products such as candy, gum, and other bulk vended products. It will also be appreciated that in order to load the hopper with vendible product as well as empty the coinage from the machine, there are usually route operators that will go from machine to machine with the necessity that the machines be loaded with additional product, and that the money be removed.

Typically, the cap is kept into an engaged position on top of the hopper, by means of a lock. The lock typically has a keyway which accommodates a key to be inserted therein and the typical lock is a screw threaded lock meaning that the lock screws onto a threaded rod which extends upwardly in the interior of the hopper. The lock, which is centrally positioned in the cap, has a threaded collar which threads onto the upper threaded portion of the hopper rod, and this is accomplished by turning the key multiple times in order to thread the lock onto the treaded rod. It is also noteworthy that the method of removal of the money from most of such bulk vending machines is that the cap must be removed, the entire hopper assembly removed from the base, in order to gain access to the coinage which is located in a coin box below the hopper. Hence, the cap must be removed from the hopper regardless of whether the operator wishes to fill the hopper with additional product, or remove the coinage.

It will be appreciated that where the operator or route man has numerous machines per day to either fill with product, or empty coinage, the operation of twisting a lock in a counter clockwise direction to remove the cap, and then reinserting the cap by screwing the cap in a clockwise direction and doing that numerous times per day is tedious and cumbersome. It has therefore been deemed desirable to create a lock which will lock the cap to the hopper of a bulk vending machine requiring no more than a quarter turn in order to eliminate the tedious rotation movement presently necessary.

The prior art shows various lock assemblies which are designed to engage and lock one element to another employing a one quarter turn of the lock. For example, U.S. Pat. No. 3,415,086 shows a lock and bayonet connector for locking an automobile hood to the body. The lock is provided with a lower stud having a t-shaped cross pin which engages a slotted bolt head. The slotted bolt head includes a first slot which extends vertically and is adapted to receive the t-shaped cross pin. The slot then turns 90° and allows the cross pin to lock in the horizontal slot.

It has been determined that a lock device of this design will not operate properly to lock a cap to a bulk vending machine hopper. The cap covering the hopper must be progressively drawn down to tightly cover the hopper and prevent any unauthorized entry as well as preventing anyone from inserting a contaminate in the hopper, since the hopper often contains food product. The only requirement of the lock shown in the -086 patent is to lock the hood to the automobile body. Hence, some degree of play is allowed as between the hood and the body.

Various other prior art patents show locking devices which engage one element to another by engaging a lock bar and pin in a curvilinear slot. U.S. Pat. No. 3,600,018 shows an automobile hood lock consisting of an upstanding slotted stud mounted to the automobile body which receives a cross pin carried in a spring loaded lock carried by the hood. The spring is required in that once the pin enters the curvilinear slot; the urging action of the spring keeps the pin engaged in the slot. To uncouple the lock, the operator inserts the key and pushes down against the urging of the spring as the lock is turned to remove the cross pin from the slot.

This design has been unsuitable for a bulk vending device for numerous reasons. Bulk vending machines are generally manufactured with a glass hopper so that the purchasing consumer can view the product in the hopper. The cap or lid is formed from a formed metal plate which is designed to seat over and tighteningly engage the hopper. As such, there is no flex or play in either the cap or the hopper to allow a lock to be pushed downwardly in order to commence engagement of the lock components. Therefore, the lock assembly cannot include any spring loaded component. The lid cannot be pushed downwardly since pushing against the lid may possibly deform the metal and result in damage to the lid and the inability of the lid to properly enclose the hopper.

Another fastening device as shown in U.S. Pat. No. 4,653,970 which accommodates a one-quarter turn lock. In this design, a locking stud is provided with an angled slot which is adapted to receive a locking bar therein. The slotted stud is pushed downwardly and turned so that the locking bar travels into the angled slot until the locking bar travels into opposed undercuts in the slot such that the locking bar will be retained in the slot. Once again, a spring is employed so that the slotted stud may be pushed downwardly to commence the unlocking sequence in order to unseat the locking bar from the undercuts.

As has been previously described, the existing design of the bulk vending machines do not allow any flex or play as between the cap and the hopper. Hence, a lock which includes an angled slot with undercuts and a lock pin which engages in the slot will not be suitable for bulk vending machines. It will be apparent that if the slot includes undercuts to engage the pin in the slot, a spring device of some type must be incorporated in the lock in order to permit disengagement of the locking pin from the undercuts in order to commence the unlocking sequence.

Similar comments are applicable to the fastening device shown in British patent 1,242,196. The lock shown in this patent, once again shows a slotted stud designed to engage a stationary lock. However, the lock pin remains in the locked or engaged position by being captured in opposed undercuts. Once again a spring is incorporated in the lock as previously described, to facilitate the unlocking sequence, as shown in FIGS. 10 and 11 of the British patent.

In co-pending application Ser. No. 11/407,834, a lock assembly was designed for particular application to a bulk vending machine. As is well known, bulk vending machines are formed with a glass hopper which contains the vendible product, and a cap which encloses the hopper. The hopper includes an upstanding stud centrally located in the hopper which has a threaded upper end. The cap is provided with a centrally positioned lock carried in a central aperture formed in the cap. As was previously described, the presently existing locks are provided with a lower threaded collar which is designed to seat onto the threaded hopper rod. Locking is achieved by placing the key in the cap lock and turning the threaded collar to engage the threaded rod, necessitating several turns of the lock to complete the locking sequence and to do likewise to unlock the cap from the hopper.

In the above co-pending application, a lock post is provided which is fixedly secured to the threaded rod. The lock post is provided with a slot adapted to receive a lock pin therein. The cap lock is provided with a lock collar secured to the lower end of the lock barrel and includes a lock pin secured within the confines of the lock collar.

The slot formed in the lock post is designed to receive the lock pin in a centrally positioned diametric slot or channel and then angled downwardly such that as the lock is turned by an appropriate key, the lock pin travels down the angles slot to a locked position.

The lock post is designed with an upper tubular portion and a lower nut portion which threadedly engages the threaded hopper rod.

However, it has been determined that the lock post formed with a lower nut portion for engaging the threaded hopper rod poses a difficulty in that it is difficult to operate a tightening tool to engage and tighten the nut onto the threaded hopper rod. In many instances, the space afforded within the interior of the hopper restricts the use of most common tightening tools such as a wrench. As a result, operators have used a flat head screwdriver to tighten the lock post onto the threaded rod. It has been found that operators insert the flat-head screwdriver into the center diametric channel and hence tighten the lock post onto the rod. However, in doing so, the screwdriver tends to damage the dimensions of the slot or channel which results in compromising the locking engagement of the lock pin in the angled channel. It was also determined that in order to fully tighten and draw the cap to the hopper, that is, to its fully closed position, the configuration of the angled channel must assume certain requirements. Hence, the combination of the improper installation methods as well as the configuration of the angled channel, compromises the locking capability of the lock assembly.

The lock assembly of the present invention now provides a lock which permits ease of installation while providing a design that will positively draw the cap tightly down to the hopper, and lock the same in position with a 90° turn of the key in the lock.

OBJECTS AND ADVANTAGES

It is therefore the principal object of the present invention to provide a lock assembly which permits ease of installation within the confines of a bulk vending machine, and that will positively draw the cap down into a lock position over the machine hopper with no more than a quarter turn of the lock.

In connection with the foregoing object, it is a further object of the present invention to provide a lock assembly of the type described, wherein the lock is provided by means of a lock post having an upper solid portion and lower tubular portion, the lower tubular portion provided with internal threads adapted to matingly engage the treaded portion of the hopper rod, and the upper solid portion of the lock post having a diametric channel formed along a transverse plane across the central portion thereof, the diametric channel extending downwardly for a predetermined distance and then extending along a curvilinear path forming a curvilinear channel and ending at a pair of opposed lock pin stops which are positioned along a plane exactly perpendicular to the transverse plane of said diametric channel.

In conjunction with the foregoing object, it is a further object of the present invention to provide a lock assembly which includes a cap lock formed by a barrel portion, and having a lock collar extending downwardly from the barrel, the lock collar having an internal tubular configuration and having a lock pin secured therein at a point spaced slightly inwardly from the outer end of the lock collar, the lock pin being designed to matingly engage with the diametric channel and curvilinear channel formed in the lock post to positively engage the lock pin to the lock post incident to the tightening of the bulk vending machine cap onto the machine hopper.

In conjunction with the foregoing objects, a further object of the present invention is to provide a lock assembly which includes a lock post, the lock post formed by a continuous uniform tubular member including an upper solid portion, and a lower tubular portion, the lower tubular portion having internal threads adapted for threadedly engaging the threads on the hopper rod.

In conjunction with the foregoing object, another object of the present invention is to provide a lock assembly of the type described, wherein the lock post includes a flange aperture formed in one portion of the tubular surface thereof and positioned slightly below the lock pin stops, and a tightening wrench formed by a grasping handle and terminating in a crescent shaped claw, the claw having a flange formed at the inner end thereof and extending outwardly a short distance, the flange being sized to fit within the flange aperture in the lock post, and the diametric dimension of the crescent shaped claw being sized to overlay the tubular lock post whereby the tightening wrench may be employed to grasp and threadingly secure the lock post to the threaded hopper rod.

Further objects and advantages of the present invention will be better understood by reference to accompanying specification taken in conjunction with the accompanying drawings.

BRIEF DESCRIPTION OF THE DRAWINGS

FIG. 4 is an elevational view showing the lock barrel and related lock collar in the unlocked position relative to the lock post mounted on the threaded rod;

FIG. 5 is an elevational view showing the lock assembly in its fully locked position with the lock barrel and related lock collar rotated into the lock position relative to the lock post mounted on the threaded rod;

FIG. 6 is a cross sectional view taken along the line 6-6 of FIG. 4, showing the position of the lock pin located in the lock collar relative to the lock post in the unlocked position; and FIG. 7 is a cross-sectional view taken along the line 7-7 of FIG. 5, showing the lock pin in its fully locked position pending in a plane which is exactly 90° perpendicular to the plane of the lock pin as shown in FIG. 6.

SUMMARY OF THE INVENTION

In summary, the present invention provides an improved lock assembly specifically intended to provide a lock which lockingly engages one element to another with a 90° turn of a key in the keyway. The lock assembly includes a lock portion including a lock barrel having a keyway at its upper end, and a lock collar extending downwardly from the lower end of the lock barrel. The lock collar is tubular in configuration, and is provided with a lock pin fixedly secured within the confines of the lock collar at a point spaced slightly upwardly from the outer end of the lock collar. A lock post is provided which is tubular in configuration, and includes an upper solid portion and a lower tubular portion, the lower tubular portion is provided with internal threads adapted to matingly engage the threaded portion of a centrally positioned hopper rod, and the upper solid portion of the lock post has a diametric channel formed along a transverse plane across the central portion thereof, the diametric channel extending downwardly for a predetermined distance and then extending along a curvilinear path forming a curvilinear channel and ending at a pair of opposed lock pin stops which are positioned along a plane exactly perpendicular to the transverse plane of the diametric channel, such that the channel is adapted to receive the lock pin of the lock collar therein when the cap is positioned onto the hopper, and the lock pin traversing the curvilinear path of the channel as the key of the lock is turned through a 90° turn until the lock pin abuts the lock pin stops thereby locking the cap onto the hopper.

The lock post is further provided with a flange aperture formed in one portion of the tubular surface thereof and positioned slightly below the lock pin stops, and a tightening wrench is provided which is formed by a grasping handle terminating in a crescent shaped claw, the claw having a flange formed at its inner end and extending outwardly a short distance, the flange being sized to fit within the flange aperture in the lock post, and the diametric dimension of the crescent shaped claw being sized to overlay the tubular lock post whereby the tightening wrench may be employed to grasp and threadingly secure the lock post onto the treaded hopper rod.

The lock assembly of the present invention eliminates any undercuts in the curvilinear channel, and further eliminates any spring-loaded device associated with the lock in order to engage and disengage the lock assembly.

Further, the lock assembly of the present invention permits ease of installation of the lock post onto the threaded hopper rod by providing a special wrench which engages the lock post in a manner that permits ease of installation thereon.

DETAILED DESCRIPTION OF DRAWINGS

Figure 1:
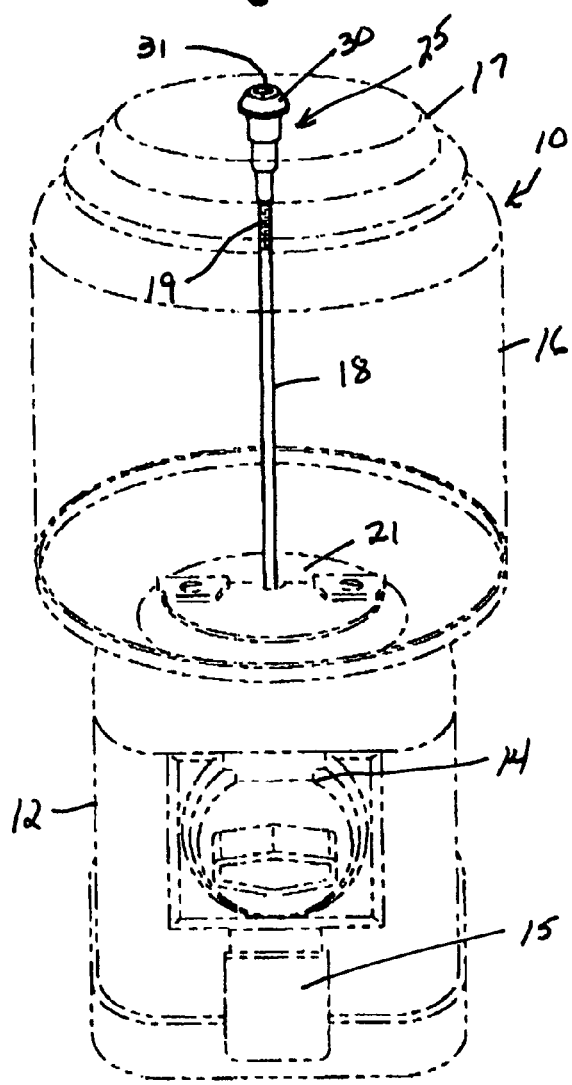
FIG. 1 is a front elevational view, partly in phantom, and showing the locking assembly of the present invention as installed on a typical bulk vending machine.

With particular reference to the figures, the lock assembly of the present invention is illustrated. With respect to FIG. 1, a typical bulk vending machine 10 is shown. The bulk vending machine 10 is formed by a base 12 which accommodates a coin mechanism 14, and the typical machine, includes a handle 13 which the operator manipulates once a coin is put into the coin mechanism 14, to obtain product from the machine via the product ramp 15. The bulk vending machine 10 includes a product hopper 16, which in the usual case, formed of clear glass. The product hopper 16 is enclosed by means of a cap or lid 17, which is secured in position by the lock assembly of the present invention. The hopper is shown to include a centrally positioned hopper rod 18, having an upper threaded portion 19 as illustrated. The hopper rod 18 is centrally positioned relative to the hopper 16, by means of a mounting plate 21. As is well known in the art, and as illustrated, the hopper 16 is generally removable from the base 12, which permits the route operator to obtain access to the coins contained within a coin compartment (not shown) in the base 12. Similarly, the cap 17 is removable from the hopper, as is necessary in order that the operator may fill the hopper 16 with additional vendible product.

Figure 2:
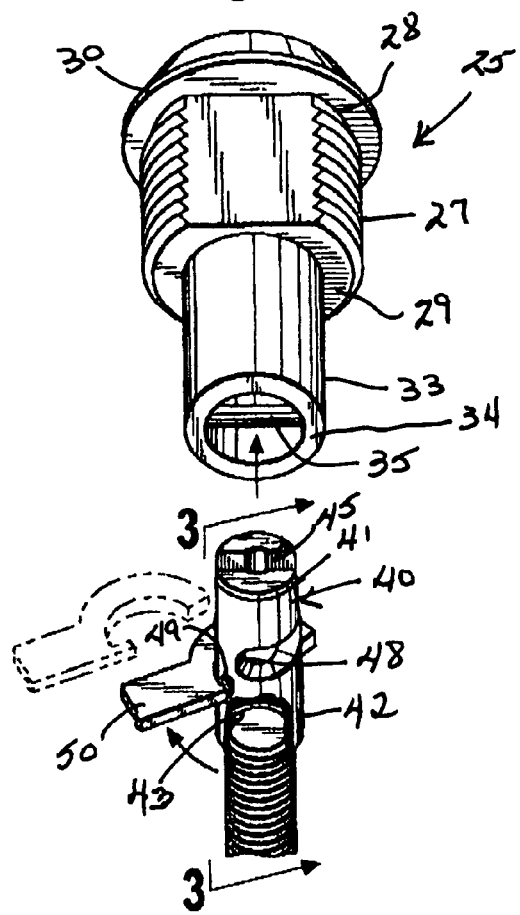
FIG. 2 is a perspective view showing the lock assembly of the present invention including the lock barrel having a lock collar mounted thereto with a locking pin secured in the tubular portion of the lock collar and showing the lock post mounted onto the threaded portion of the hopper rod by means of a tightening wrench.
Figure 3A:
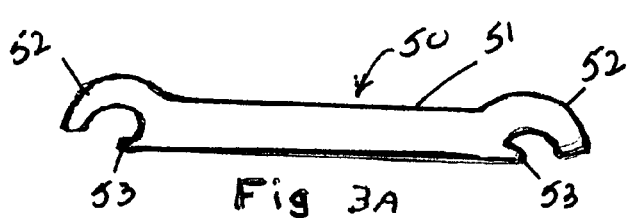
FIG. 3A is a perspective view of the tightening wrench of the present invention.
Figure 3:
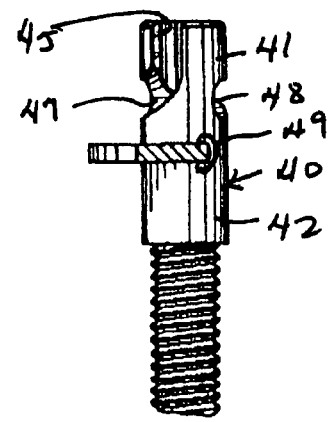
FIG. 3 is a front elevational view showing the lock post as mounted onto the threaded portion of the hopper rod, and the tightening wrench in position relative to the lock post.

The lock assembly 25 of the present invention is illustrated more particularly in FIGS. 2 and 3 of the drawings. The lock assembly 25 is generally formed by a lock barrel 27 which has an upper end 28 and a lower end 29. The upper end 28 accommodates a lock head 30 which accommodates a keyway 31 at the top end thereof for accommodating an appropriate key (not shown). The lower end 29 of the barrel 27 is provided with a lock collar 33 which is basically tubular in configuration having a hollow interior. The lock collar 33 accommodates a lock pin 35 which is fixedly secured within the confines of the lock collar 33 at a point spaced upwardly and adjacent to the outer end 34 of the lock collar 33. As is well known in the art, by inserting the proper key into the keyway 31 of the lock 25, the operator may manipulate the lock which in effect turns the lock collar 33. The lock assembly 25 of the present invention would include a two-position lock, the two positions being spaced apart by 90°. Hence, the lock in the lock position will have a first position, and when the key is manipulated 90° to the second position, the lock will be in the unlocked position.

The other component of the lock assembly 25 of the present invention is the lock post 40. The lock post 40 includes an upper solid portion 41 and a lower tubular portion 42. It will be observed from FIGS. 2 and 3 of the drawings, that the lock post 40 assumes a uniform tubular configuration from the upper solid portion 41 through the lower portion 42. The lower portion 42 includes internal threads 43 which are designed to matingly engage the threaded portion 19 of the hopper rod 18.

The lock post 40 includes a diametric channel or slot 45 which is cut into the upper solid portion 41 of the lock post 40. The diametric channel 45 is cut along a central access of the lock post 40 and is centrally positioned. As shown in FIG. 3, the diametric channel 45 extends downwardly for a predetermined distance, that distanced measured by the distance between the outer end 34 of the lock collar 33, and the internal top end of the lock pin 35. It will further be observed that the lock collar 33 has an internal diametric dimension which is sized to seat over the external diameter of the lock post 40. In this manner, the upper lock assembly will fit over the lock post 40 until the lock pin 35 seats into the diametric channel 45.

It will be observed that the diametric channel 45 is formed along a transverse plane across the central portion of the lock post 40. The diametric channel 45 extends downwardly for a predetermined distance and then extends along a curvilinear path forming a curvilinear channel 47. The curvilinear channel 47 ends at a pair of opposed lock pin stops 48. It will further be observed that the plane formed by the opposed lock pin stops 48 is precisely 90° transverse to the plane formed by the upper diametric channel 45.

As further illustrated in FIGS. 2 and 3 of the drawings, the lock post 40 is provided with a flange aperture 49 which accommodates the tightening tool as will be more fully described hereinafter. The lock post 40, as illustrated, may be easily screwthreadedly mounted to the hopper rod 18, by engaging the internal threads 43 of the lock post 40, onto the threaded portion 19 of the hopper rod 18. Tightening is accomplished by means of the tightening tool as illustrated.

As is well understood in the art, the lock assembly 25, especially the lock barrel 27 is secured to the cap 17 by means of an aperture (not shown) provided in the cap 17 through which the lock barrel 27 is inserted. The lock barrel is kept in place by means of a lock nut (not shown) in the typical manner well known in the art. The lock collar 33 extends downwardly and engages the lock post 40 in a manner such that the lock pin 35 will enter into the diametric channel 45, and to be rotated to the lock position, the key is inserted in the keyway 31 and the lock manipulated 90°. This action will cause the lock pin 35 to traverse the curvilinear channel and stop at the lock pin stops 48 in a position which will be exactly 90° relative to the plane of the diametric channel in the lock post 40. As further observed in the drawings, there are no under cuts relative to the curvilinear channel 47, in order to prevent the lock pin 35 from locking into the channel and thereby rendering the unlocking sequence difficult if not impossible. The lock assembly 25 of the present invention eliminates any need for spring devices associated therewith, given the fact that the cap 17 is formed of a metal material, and therefore has no flex associated with it without damaging the lid or cap 17.

FIG. 3A illustrates the tightening wrench 50 of the present invention. The tightening wrench 50 is formed by handle section 51 which terminates at either end in a crescent shaped claw 52. By having a crescent shaped claw portion 52 at either end of the handle 51, the wrench may be used by either left handed or right handed personnel, and will operate equally efficiently. Each of the claws 52 is shown to be provided with a flange 53 which extends inwardly into the claw area as illustrated. The flange 53 is sized and adapted to be accepted into the flange aperture 49 of the lock post 40, in a manner illustrated in FIGS. 2 and 3 of the drawings. The crescent shape of the claw 52 is sized to overlay and surround the tubular dimension of the lock post 40, and as shown in FIG. 2 of the drawings, once the flange 53 is inserted into the flange aperture 49, will operate to either screw or unscrew the lock post 40 from the threaded rod 18. Hence, the wrench 50 of the present invention eliminates the need for using any type of extraneous wrench or screwdriver for mounting the lock post 40 onto the treaded rod 18. Furthermore, the wrench 50 is designed with a length such that it will fit within the confines of the hopper 16 of a typical bulk vending machine. Therefore the need for any extraneous or enlarged wrenches is eliminated.

With respect to FIG. 4, the positioning of the lock at the commencement of the locking sequence is illustrated. As shown therein, the lock assembly including the lock barrel 27 having the associated lock collar 33 extending downwardly therefrom is shown in position on top of the lock post 40. In this position, the lock pin 45 is located at the very upper end of the diametric channel 45 to initiate the locking sequence. The key K is fitted into the lock keyway 31, and a clockwise rotation is initiated. As the clockwise rotation is initiated, the lock pin 35 will enter into the diametric channel 45 and proceed downwardly until the lock pin passes into the curvilinear channel 47. The continued rotation of the key K will cause the lock pin 35 to travel to the full extant of the curvilinear channel 47 and come to rest against the lock pin stops 48 which represents the end point of the curvilinear channel 47. This positioning is showed in FIG. 5 of the drawings. As further illustrated in FIG. 5, the key K is now in a position exactly 90° relative to its positioning in FIG. 4 which is the fully unlocked position.

FIGS. 6 and 7 clearly illustrate that the plane of the lock pin 35 is in a plane transverse along a central plane relative to the lock post 40 at the inception of the locking sequence. Indeed, FIG. 6 represents the unlocked positioning of the lock pin 35 relative to the lock post 40. In FIG. 7, the lock pin 35 is now fully rotated throughout the extant of the curvilinear channel 45 and has come to rest against the lock pin stops 48. It will be observed that the lock pin in FIG. 7 in a fully locked position as shown in phantom, and is shown to be in a plane exactly 90° perpendicular to the plane of the lock pin in the fully unlocked position.

It will be appreciated that once the lock pin 35 has been fully turned into the fully locked position and resting against the lock pin stops 48, the key K may be removed from the keyway 31 and the lock collar 33 will remain in position in the fully locked position as shown in FIGS. 5 and 7 of the drawings.

It is also clearly shown that the curvilinear channel 47 at the end point thereof, namely at the lock pin stops 48, eliminates any undercut which would have the tendency to engage and catch the lock pin 35 which would in effect render the unlocking procedure or sequence difficult if not impossible.

As was previously indicated, the requirements for the proper operation of the lock assembly 25 of the present invention is that the lock post 40 be provided with means for properly securing the lock post 40 to the threaded rod 18 located centrally in the hopper 16. Furthermore, the further requirement is that the curvilinear channel 47 which extends from the diametric channel 45, end at a point such that the plane formed by the opposed lock pin stops 48 is a plane which is exactly 90° perpendicular to the plane formed by the diametric channel 45 at the top of the lock post 40. This accommodates a precise 90° turn of the lock, and provides for lock points for the lock wherein the lock pin 35 is engaged in the curvilinear channel 47, in a fully locked and engaged position.

While the lock assembly of the present invention is specifically designed for bulk vending machines, it will be appreciated that the present lock has application in any environment wherein the elements to be locked together cannot flex or have any play associated with them. Furthermore, the lock assembly of the present invention permits economics in terms of manufacture, since there are no springs or extraneous other types of flexing devices associated with the lock. Hence, while there has been described what is at present considered to be the preferred embodiment of the invention, various modifications may be made therein, and all such modifications are intended to be covered by the appended claims.

The invention claimed is:

1. a lock assembly for locking a cap onto a vending product hopper adapted to contain a vendible product, the hopper provided with a centrally positioned rod extending upwardly through the hopper, the rod having a threaded portion at the top end thereof, the lock assembly comprising, a lock formed by a lock barrel having an outer end and inner end, the lock barrel having a keyway at its outer end to accommodate a key therein, and said lock barrel including securement means for securing said lock barrel to the cap, said lock barrel having a tubular collar secured to the inner end thereof and extending outwardly to an outer end, said lock collar having a lock pin secured across said tubular lock collar a predetermined distance from the outer end thereof, a tubular lock post having an upper solid portion and a lower tubular portion, said lower tubular portion provided within internal threads adapted to matingly engage said threaded portion of the centrally positioned hopper rod, said upper solid portion of said lock post having a diametric channel formed along a transverse plain across the central portion thereof, said diametric channel extending downwardly for a predetermined distance and then extending along a curvilinear path and ending at a pair of opposed lock pin stops which are positioned along a plane exactly perpendicular to the transverse plane of said diametric channel, said channel adapted to receive said lock pin of said lock pin of said lock collar therein when said cap is positioned on to said hopper, said lock pin traversing said curvilinear path of said channel as the key of the lock is turned through a 90° turn until said lock pin abuts said lock pin stops, thereby locking said cap onto the hopper, said lock post further provided with a flange aperture formed in one portion of the tubular surface thereof, and positioned slightly below said lock pin stops, a tightening wrench formed by a grasping handle and terminating in a crescent shaped claw, said claw having a flange formed at its inner end and extending outwardly a short distance, said flange being sized to fit within said flange aperture and said lock post, and the diametric dimension of said crescent shape claw being sized to overlay said tubular lock post, whereby said tightening wrench may be employed to grasp and threadingly secure said lock post to said threaded hopper rod.

* * * * *